United States Patent [19]
Nohda

[11] 4,447,717
[45] May 8, 1984

[54] AUTOMATIC FOCUSING DEVICE IN A STEREOSCOPIC MICROSCOPE

[75] Inventor: Masao Nohda, Yokosuka, Japan
[73] Assignee: Nippon Kogaku K.K., Tokyo, Japan
[21] Appl. No.: 343,986
[22] Filed: Jan. 29, 1982
[30] Foreign Application Priority Data
Mar. 27, 1981 [JP]  Japan .................. 56-44121
[51] Int. Cl.³ .............................. G02B 7/11
[52] U.S. Cl. .................... 250/201; 350/515
[58] Field of Search ............... 250/201, 204; 350/511, 350/514, 515, 516, 518; 354/25; 356/4, 122, 123, 125

[56] References Cited
U.S. PATENT DOCUMENTS

| | | | |
|---|---|---|---|
| 3,721,827 | 3/1973 | Reinheimer | 250/201 |
| 3,994,558 | 11/1976 | Schulz et al. | 350/516 |
| 4,009,930 | 3/1977 | Abe et al. | 350/516 |
| 4,293,187 | 10/1981 | Ishibai et al. | 250/201 X |
| 4,363,961 | 12/1982 | Okada et al. | 250/204 X |

Primary Examiner—William L. Sikes
Assistant Examiner—Darwin R. Hostetter
Attorney, Agent, or Firm—Fitzpatrick, Cella, Harper & Scinto

[57] ABSTRACT

An automatic focusing device in a stereoscopic microscope having a pair of left and right stereoscopic observation optical systems disposed rearwardly of a common objective lens includes automatic focusing means for converting an amount of focus deviation into an electrical signal and automatically controlling the stereoscopic microscope to its in-focus position on the basis of the electrical signal, and selector means for selecting the operation and non-operation of the automatic focusing means.

9 Claims, 7 Drawing Figures

AUTOMATIC FOCUSING DEVICE IN A STEREOSCOPIC MICROSCOPE

BACKGROUND OF THE INVENTION

1. Field of the Invention

This invention relates to an automatic focusing device in a stereoscopic microscope having an objective lens common to left and right stereoscopic observation optical systems of the stereoscopic microscope, and is particularly best suited for a microscope for use in surgical operations.

2. Description of the Prior Art

As a system for detecting the in-focus position of a microscope, there are known (1) a system which utilizes air pressure to make constant the distance between the end of an objective lens and a stage, (2) a system which moves a stage to a position whereat the contrast of the image on a focusing screen becomes maximum, and (3) a system which moves a stage so as to correct any variation in the light path of the reflected light of a light beam applied to a sample.

SUMMARY OF THE INVENTION

I have conceived and contribute by the present invention an automatic focusing device best suited for a stereoscopic microscope.

According to one aspect of the present invention, I provide an automatic focusing device in a stereoscopic microscope which is compact and good in operability.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
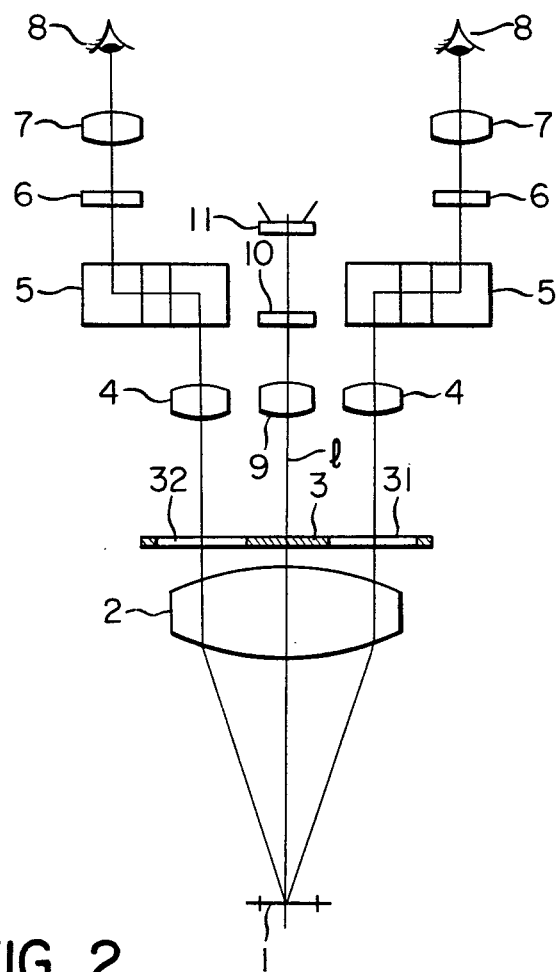
FIG. 1 is a sectional view taken in a plane containing the left and right optical axes of left and right stereoscopic observation optical systems in a first embodiment of the present invention.
Figure 2:
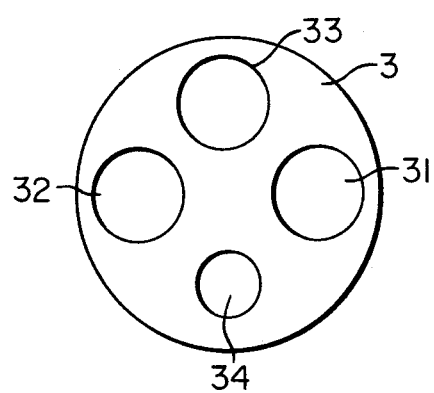
FIG. 2 is a plan view of the diaphragm of FIG. 1.

Referring now to the drawing, and more particularly to FIGS. 1 to 4, reference numeral 1 designates a sample to be observed, reference numeral 2 denotes a common objective lens positioned above the sample 1 to be observed and reference numeral 3 designates a diaphragm disposed adjacent the objective lens 2 and having observation openings 31, 32, a projection opening 33 and a metering opening 34, as shown in FIG. 2. Reference numeral 4 denotes paired left and right imaging optical systems disposed above of the common objectives lens 2, as viewed in FIG. 1, for imaging the sample 1, reference numeral 5 designates a pair of left and right erect poroprisms provided above the imaging optical systems 4, reference numeral 6 denotes left and right focusing screens disposed above the erect poroprisms 5 and at the rearward focus positions of the imaging optical systems 4, and reference numeral 7 designates left and right eyepieces for observing the focusing screen 6 therethrough. The imaging optical systems 4, the erect poroprisms 5, the focusing screens 6 and the eyepieces 7 together constitute a stereoscopic observation optical system. Reference numeral 8 designates the examiner's eyes.

Figure 3:
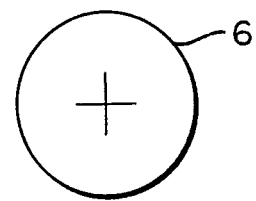
FIG. 3 is a plan view of the focusing screen of FIG. 1.

The above-described construction, except the diaphragm openings 33 and 34, is a well-known stereoscopic microscope (but in the well-known stereoscopic microscope, the diaphragm 3 is not always required). At least one of the focusing screens 6 is formed with an index mark such as a reticule, as shown in FIG. 3. The center of this index mark is substantially coincident with the center of the focusing screen 6 and provides the standard for focusing; it is also used for adjustment of visibility. As will hereinafter be described in detail, a lens 9, an infrared ray transmitting filter 10 and a bisecting element 11 having light-receiving elements 11a and 11b and serving as a position sensor together constitute a metering optical system.

Figure 4:
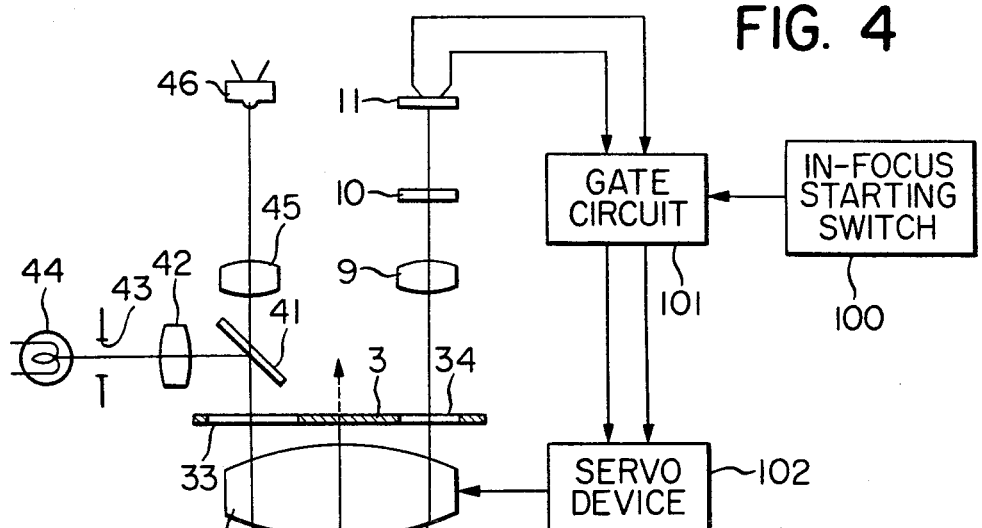
FIG. 4 shows an optical system in a plane containing the metering optical axis l and perpendicular to the plane of the drawing sheet in FIG. 1.

In FIG. 4, reference numeral 41 designates a dichroic mirror obliquely disposed above the projection opening 33 of the diaphragm 3 for transmitting infrared light therethrough and reflecting visible light, reference numeral 42 denotes a condenser lens provided in the path of light reflected by the dichroic mirror 41, and reference numeral 43 designates a diaphragm provided at the rearward focus position of the condenser lens 42, the opening of the diaphragm being determined so as to be conjugate with the sample 1 in the in-focus position and substantially coincident with the view field of the sample 1, thereby determining the illuminating area. Reference numeral 44 designates an illuminating lamp disposed behind the diaphragm 43, reference numeral 45 denotes a lens provided in the path of light transmitted through the dichroic mirror 41, and reference numeral 46 designates a source of infrared rays such as an infrared ray emitting diode provided at the rearward focus position of the lens 45.

Since the infrared ray emitting diode 46 lies at the rearward focus position of the lens 45 and the in-focus position of the observation optical system lies at the forward focus position of the common objective lens 2, the sample 1 which lies in the in-focus position is conjugate with both the infrated ray emitting diode 46 and the focusing screen 6. The bisecting element 11 is provided at the rearward focus position of the lens 9 and is disposed in such a position that in the in-focus condition, the reflected image of the infrared ray emitting diode 46 is formed at an area just equal to respective light-receiving surfaces and that the reflected image is biased toward one of its light-receiving elements due to front focus or rear focus. That is, the center of the diode 46, the center of the index mark of the focusing screen 6 and the center of the bisecting element 11 are optically coincident with one another.

The output signals of the bisecting element 11 are applied as input to a gate circuit 101 which is opened by closing of an in-focus starting switch 100, and applies the output signals of the bisecting element 11 to a servo device 102. The servo device 102 determines the direction of drive of the lens 2 by the magnitude of the output signals through a conventional mechanism, not shown, and stops driving when the two signals become equal.

Figure 5:
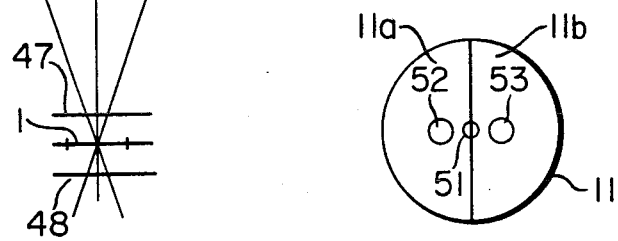
FIG. 5 illustrates the manner in which the reflected image of a diode is formed on a bisecting element.

With such a construction, the light beam emitted from the infrared ray source 46 passes through the lens 45, the dichroic mirror 41 and the objective lens 2 and is projected upon the sample 1.

Where the position of the sample 1 is coincident with the focus of the objective lens 2, the reflected image of the diode 46 is formed at the central portion of the element 11 as indicated at 51 in FIG. 5, namely, at an area equal to respective elements 11a and 11b. Accordingly, the output signals of the bisecting element 11 become equal. At this time, the observer can stereoscopically observe an image focused at the center of the index mark.

However, where the sample 1 is not coincident with the focus of the objective lens 2, namely, where the sample 1 lies at a rear focus position 47 or at a front focus position 48, the reflected image of the diode is formed on the bisecting element 11 as images 52 and 53 larger in diameter than the image 51 (see FIG. 5).

Accordingly, in positions other than the in-focus position, an unbalance corresponding to the amount of focus deviation is produced between the output signals of the bisecting element 11 and the front focus or the rear focus can be determined depending upon which of the output signals is greater, and the degree of deviation can be known from the difference therebetween. The output signals of the bisecting element 11 are applied as input to the servo device 102 when the gate 101 is opened upon closing of the switch 100. The servo device 102 determines the direction in which the lens 2 is to be moved, from which of the outputs of the bisecting element 11 is greater, and stops moving the lens 2 when the two outputs have become equal. Thereby, the in-focus condition is obtained.

By closing the switch 100 in this manner when required by the observer, focusing to the center of the index mark can be automatically accomplished. It is of course possible to provide a mechanism for maintaining the switch 100 in its ON condition so that automatic focusing may be accomplished without resorting to selection by the observer.

However, it is usually the case with a stereoscopic microscope that various operations are effected on a sample while microscopic examination is being effected, and it is very cumbersome when focusing operation is effected each time a hand, a pincette or the like comes into the picture plane and therefore, the stereoscopic microscope is usually used in such a manner that focusing is effected in accordance with selection by the observer. Particularly, in the case of a surgical operation microscope, operation is applied to a sample (a patient or the like) by both hands while microscopic examination is being effected and therefore, it may be said to be requisite to make the switch 100 operable by foot, namely, by a foot switch, so that focusing can be effected only when this switch is closed by the foot.

Although the above-described embodiment is of a construction in which the objective lens 2 is vertically moved, the entire microscope may be vertically moved or the stage on which the sample 1 is placed may be moved.

Figure 6:
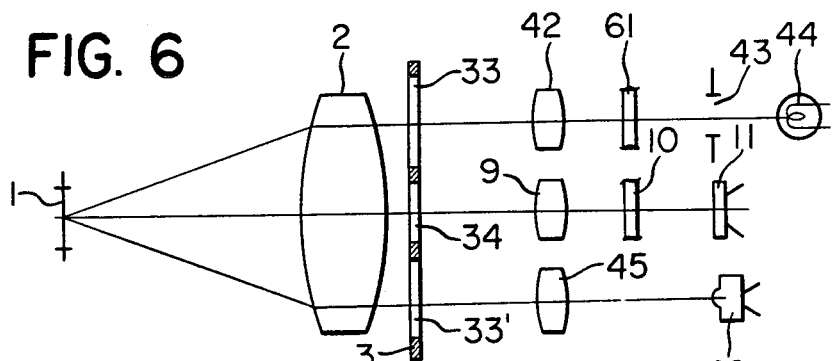
FIG. 6 is a view similar to FIG. 4 but showing a second embodiment of the present invention.

It is apparent that a similar result will be obtained even if the positions of the bisecting element 11 and the light-emitting diode are reversed relative to their FIG. 4 positions, and further, a second embodiment entirely similar in function to the above-described embodiment may be obtained even if the illuminating optical system and the projecting optical system are separated from each other as shown in FIG. 6. However, in FIG. 6, an infrared ray absorbing filter 61 for cutting the infrared rays from an illuminating lamp 44 is provided over the width of the path of illuminating light. The S/N of the output signals of the bisecting element 11 is increased by the filter 61.

As is apparent from the foregoing description, the bisecting element 11 may be any element which will enable the position of the reflected image to be known, and what is generally called a position sensor may be widely used as the bisecting element.

Figure 7:
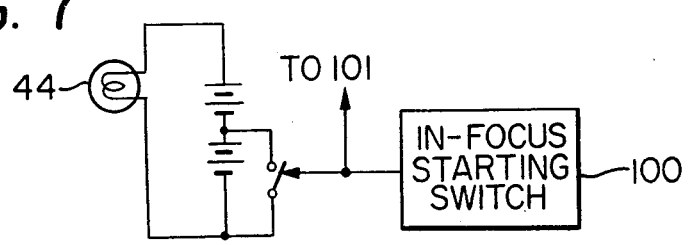
FIG. 7 diagrammatically shows an example of a circuit for varying the brightness of an illuminating lamp in operative association with a focusing start switch.

Further, the light source for the projecting optical system is not restricted to one which emits infrared light, but may be one which is wavelength-separated from the illuminating light, and it will be sufficient if the brightness of the light source is of a degree which makes a contrast with the illuminating light. Particularly, where there is not so great a contrast, it will be convenient to make a design such that, as shown in FIG. 7, only when the switch 100 is closed, the contact of a shunt circuit having a normally open contact parallel-connected to a portion of the power source 44a of the light source 44 is closed by the ON signal of the switch 100 thereby to decrease th quantity of the illuminating light and increase the S/N during metering.

In the above-described embodiment, the in-focus detecting device (45, 46, 9, 10, 11) best suited for the stereoscopic microscope has been mentioned as an example, but an in-focus detecting device of another type, for example, of the type which detects the contrast of the image on the focusing screen, may of course be employed. Further, instead of providing the gate circuit, design may be made such that the servo device 102 is rendered operative or inoperative directly by the signal from the switch 100. Also, the gate circuit 101 may use an interlocking switch which effects ON-OFF of the line. In that case, the switch 100 may be eliminated and design may be such that the bisecting element 11 is connected to the servo device 102 upon closing of the interlocking switch and that the connection between the bisecting element 11 and the servo device 102 is cut off upon opening of the interlocking switch.

I believe that the construction and operation of my novel automatic focusing device in a stereoscopic microscope will now be understood and that the advantages thereof will be fully appreciated by those persons skilled in the art.

I claim:

1. An automatic focusing device for a stereoscopic microscope having a pair of left and right stereoscopic observation optical systems disposed rearwardly of a common objective lens, said automatic focusing device including:

automatic focusing means having optical means disposed rearwardly of the objective lens and out of the optical path of each of said stereoscopic observation systems to form together with the objective lens an optical path for focus detection, the automatic focusing means producing an electric signal corresponding to focus deviation and based on an optical image formed by said optical means and the objective lens and controlling automatically the stereoscopic microscope to an in-focus position thereof based on the electric signal, and means for selecting operation and non-operation of said automatic focusing means.

2. An automatic focusing device according to claim 1, wherein said optical means include a light projecting optical member and a light receiving member, the optical axes of both the members being parallel to each other and bent through the objective lens to intersect at an in-focus position in front thereof, said automatic focusing means further including metering light projecting means and photoelectric conversion means, the metering light projecting means being disposed rearwardly of said projecting optical member and projecting metering light through said projecting optical member and the objective lens onto an object to be observed, and said photoelectric conversion means receiving said metering light reflected by the object and passed through the objective lens and said light receiving member and producing a photoelectric conversion signal as output.

3. An automatic focusing device according to claim 2, wherein said automatic focusing means further includes controlling means which receive the photoelectric conversion signal from said photoelectric conversion means to control the stereoscopic microscope to the in-focus position.

4. An automatic focusing device according to claim 3, wherein said selecting means include a gate circuit disposed between said photoelectric conversion means and said controlling means and switching means for controlling the opening-closing of said gate circuit by extraneous operation.

5. An automatic focusing device according to claim 2, wherein a light projecting plane of said light projecting means, a light receiving plane of said photoelectric conversion means and a focusing plane of the stereoscopic microscope are provided rearwardly of the objective lens to be conjugate with each other with respect to the object, and wherein said controlling means displaces the objective lens only.

6. An automatic focusing device according to claim 4, wherein said projecting means includes a light emitting diode, said photoelectric conversion means includes a bisected photoelectric conversion element which receives the metering light from said light emitting diode and which is so arranged that signals photoelectrically converted through the bisected segments of the element are equal to each other when the stereoscopic microscope is in the in-focus position.

7. An automatic focusing device according to claim 4, wherein said switch means is a foot switch operable by a foot.

8. An automatic focusing device in a stereoscopic microscope having a pair of right and left stereoscopic observation optical systems disposed rearwardly of a common objective lens, said automatic focusing device comprising:

diaphragm means disposed rearwardly of an adjacent to the objective lens, the diaphragm means having first to fourth openings, the first opening being formed between one of said observation optical systems and the objective lens, the second opening being formed between the other of said observation optical systems and the objective lens, optical means having a light projecting member disposed rearwardly of the third opening of said diaphragm means and a light receiving member disposed rearwardly of the fourth opening of the diaphragm means, light source means disposed rearwardly of said projecting member, photoelectric conversion means disposed rearwardly of said light receiving member and producing as output an electric signal corresponding to a position of an optical image in a direction perpendicular to the optical axis, formed by light projected from said optical means, controlling means for receiving as input the electric signal from said photoelectric conversion means and controlling said stereoscopic microscope to an in-focus position, and means for determining whether said controlling means effects focusing control.

9. An automatic focusing device according to claim 8, wherein said light source means includes an infrared ray emitting diode, and said automatic focusing device further includes a dichroic optical member disposed between the third opening of said diaphragm means and said projecting optical member to reflect illumination light for observation, the optical member passing therethrough infrared rays from said infrared ray emitting diode.

* * * * *